United States Patent
Lauber

(10) Patent No.: US 12,032,911 B2
(45) Date of Patent: Jul. 9, 2024

(54) SYSTEMS AND METHODS FOR STRUCTURED PHRASE EMBEDDING AND USE THEREOF

(71) Applicant: Nice Ltd., Ra'anana (IL)

(72) Inventor: Stephen Lauber, Modi'in (IL)

(73) Assignee: Nice Ltd., Ra'anana (IL)

( * ) Notice: Subject to any disclaimer, the term of this patent is extended or adjusted under 35 U.S.C. 154(b) by 285 days.

(21) Appl. No.: 17/144,695

(22) Filed: Jan. 8, 2021

(65) Prior Publication Data

US 2022/0222437 A1 Jul. 14, 2022

(51) Int. Cl.
| G06F 40/289 | (2020.01) |
| G06F 1/03 | (2006.01) |
| G06N 20/00 | (2019.01) |
| G10L 15/26 | (2006.01) |

(52) U.S. Cl.
CPC .............. *G06F 40/289* (2020.01); *G06F 1/03* (2013.01); *G06N 20/00* (2019.01); *G10L 15/26* (2013.01)

(58) Field of Classification Search
CPC ........... G06F 40/289; G06F 1/03; G10L 15/26
See application file for complete search history.

(56) References Cited

U.S. PATENT DOCUMENTS

| 10,824,818 | B2* | 11/2020 | Peper .................... G06N 20/20 |
| 10,970,493 | B1* | 4/2021 | Lee ........................ G06F 40/30 |
| 2004/0260551 | A1* | 12/2004 | Atkin ..................... G10L 13/08 |
| | | | 704/E13.011 |
| 2005/0033750 | A1* | 2/2005 | Cobb .................... G06F 16/289 |
| 2006/0026152 | A1 | 2/2006 | Zeng et al. |
| 2016/0042053 | A1 | 2/2016 | De Sousa Webber |
| 2018/0189307 | A1 | 7/2018 | Yu et al. |
| 2018/0308487 | A1 | 10/2018 | Goel et al. |
| 2019/0103104 | A1* | 4/2019 | Nicholls ............. G10L 15/1822 |
| 2019/0156822 | A1* | 5/2019 | Manuvinakurike ..... G10L 25/78 |

(Continued)

FOREIGN PATENT DOCUMENTS

| WO | WO-2017180475 A1 * | 10/2017 | ......... G06F 16/2237 |
| WO | WO-2022060970 A1 * | 3/2022 | ......... G06K 9/00362 |

OTHER PUBLICATIONS

Arora, Sanjeev, Yingyu Liang, and Tengyu Ma. "A simple but tough-to-beat baseline for sentence embeddings." (2016).

(Continued)

*Primary Examiner* — Anne L Thomas-Homescu
(74) *Attorney, Agent, or Firm* — PEARL COHEN ZEDEK LATZER BARATZ LLP

(57) ABSTRACT

A system and method for training and using a text embedding model may include creating structured phrases from an input text; creating turn input samples from the input text, each turn input sample based on only or consisting of input from a single turn within the text and being formed by removing structure from structured phrases; and training an embedding model using the structured phrases and turn input samples. Call input samples may be created based on input from more than one turn within the text. At each level of resolution (e.g. phrase, speaker, call), a different level of resolution may be used to create input samples. At inference an embedding may be based on a weighted combination of the sub-terms within an input phrase, each weight being based on an inverse document frequency measure for the sub-term associated with the weight.

14 Claims, 4 Drawing Sheets

(56) References Cited

U.S. PATENT DOCUMENTS

| | | | |
|---|---|---|---|
| 2019/0244603 A1* | 8/2019 | Angkititrakul | G10L 15/22 |
| 2020/0098366 A1* | 3/2020 | Chakraborty | G06N 3/08 |
| 2022/0100798 A1* | 3/2022 | Donaldson | G06F 21/53 |
| 2022/0108068 A1* | 4/2022 | Datla | G06F 40/279 |

OTHER PUBLICATIONS

Levy, Omer, and Yoav Goldberg. "Dependency-based word embeddings." *Proceedings of the 52nd Annual Meeting of the Association for Computational Linguistics* (vol. 2: Short Papers). 2014.

Pagliardini, Matteo, Prakhar Gupta, and Martin Jaggi. "Unsupervised learning of sentence embeddings using compositional n-gram features." *arXiv preprint arXiv:1703.02507* (2017).

Quoc et al., "Distributed Representations of Sentences and Documents.", 2014., arXiv preprint arXiv:1405.4053v2.

Kusner et al., "From Word Embeddings to Document Distances.", Proceedings of the 32nd International Conference on Machine Learning., 2015., vol. 37, JMLR W&Cp, Lille, France.

Kiros et al., "Skip-Thought Vectors.", 2015., arXiv preprint arXiv:1506.06726v1.

Hill et al., "Learning Distributed Representations of Sentences from Unlabelled Data.", 2016., arXiv preprint arXiv:1602.03483v1.

Arora et al., "A Simple but Tough-to-Beat Baseline for Sentence Embeddings.", Conference Paper at ICLR, 2017.

Chen, Minmin., "Efficient Vector Representation for Documents Through Corruption.", 2017., arXiv preprint arXiv:1707.02377v1.

Pagliardini et al., "Unsupervised Learning of Sentence Embeddings using Compositional n-Gram Features.", 2018., arXiv preprint arXiv:1703.02507v3.

Logeswaran et al., "An Efficient Framework for Learning Sentence Representations.", 2018., arXiv preprint arXiv: 1803.02893v1.

* cited by examiner

SYSTEMS AND METHODS FOR STRUCTURED PHRASE EMBEDDING AND USE THEREOF

FIELD OF THE INVENTION

The invention relates generally to the use of phrase embeddings for text analysis, and specifically novel structured and combined phrase embeddings.

BACKGROUND OF THE INVENTION

Companies and organizations such as call centers may use textual analysis relying on phrase embeddings to perform various functions, such as summaries, highlighting, or topic analysis of transcripts of conversations or calls between customer service agents and customers. An embedding may represent words, phrases (or some other unit of text) as vectors, embedded in a vector space.

Natural language processing (NLP) may represent or map words, phrases, multi-word phrases, sentences, or strings or other groups of words as embeddings, vectors (e.g. ordered lists of values or continuous numbers) or distributed vectors. A vector may be a semantic measure, or a measure of the linguistic context, of the word(s) associated with the vector. The similarity, e.g. cosine similarity, or distance, e.g. Euclidian distance, between two vectors may measure the amount of semantic or meaning similarity between the words or groups of words associated with each vector. Vectors representing words or phrases are such that a simple mathematical function (e.g., cosine similarity) may indicate the level of semantic similarity between the words or phrases represented by those vectors.

Vectors can be created from words or strings or groups of words using algorithms such as the word2vec word embedding creation algorithm, or another suitable process, which may output an embedding or vector, typically of several hundred values or dimensions (e.g., 200 values or dimensions), with each unique word or string being assigned a corresponding vector. An embedding vector for a string of text may be created by inputting the string into a machine learning (ML) algorithm such as a specialized neural network (NN) which may be trained, typically in an unsupervised manner, and learn word associations from a large corpus of text. In such NNs, the input layer and output layer may be identical, and an internal layer may provide the embedding.

Once trained, the model can for example detect synonymous words.

In machine learning, training describes creating a model from a large body of data, the 'training set', examples from which the algorithm will generalize. Training samples are the individual examples, collectively forming the training set, which are fed into the training algorithm.

Prior art techniques for training a word embedding model (e.g. word2vec) may include choosing a sometimes arbitrary context window size for input text: too large a window will include more 'noisy neighbors' reducing the precision of the embeddings, whereas too narrow a window might not catch sufficient context, thereby reducing the richness and quality of the embeddings. When training a model to create the embeddings of words or phrases, neighboring words (e.g. those within a certain distance) provide their respective 'contexts', following the principle that the meaning of a word can be discovered by the company it keeps. Moreover, the standard techniques of combining individual word embeddings into phrase embeddings (often using some sort of linear combination of the individual vectors) typically ignore the fact that the semantic meaning of a phrase is not necessarily the sum of its constituent words. For example, the meaning of to 'give up' is not simply the combined meanings of 'give' and 'up', and similarly, the meaning of to 'turn on' is not simply 'turn' and 'on' etc.

Prior embedding training techniques use only one resolution or level for the input text, e.g. a sliding window applied across each sentence.

SUMMARY OF THE INVENTION

A computer based system and method for training and using a text embedding model may include creating one or more structured phrases from an input text; creating one or more turn input samples from the input text, each turn input sample based on only or consisting of input from a single turn within the text and at least some turn samples being formed by removing structure from structured phrases (e.g. to form a string of text); and training an embedding model using the structured phrases and turn input samples. Call input samples may be created based on input from more than one turn within the text, and training may include using call samples as well. At each level of input or resolution (e.g. phrase, speaker, call), a different level of resolution, focus or detail may be used to create input samples. Training may include generating possibly multiple combinations of terms, each combination constituting a single training sample to be used to train the embedding model, each combination corresponding to a subset of the slots in a single structured phrase, and including the (possibly multi-word) terms contained in the selected slots.

At inference an embedding may be based on a weighted combination of the terms or sub-terms within an input phrase, each weight being based on an inverse document frequency measure for the sub-term associated with the weight.

There is often a desire to analyze or process a text at the phrase level rather than at the individual word level e.g. for the purpose of keyphrase extraction, event extraction, information retrieval queries etc. This is particularly relevant when dealing with call center conversations, where certain terms, ideas, issues, actions, and events reoccur, and usually constitute the focal points of the conversation. Some of these terms are shared across industries (e.g. 'cancel service', 'pay past due', 'speak to supervisor', etc.), while each industry or domain may also have its own set of commonly used terminology and jargon (e.g. 'cancel cable tv subscription', 'unplug cable from modem', 'send a technician to install, 'upgrade cellular plan', etc.), making it desirable (and feasible, due to the relatively closed and self-contained nature of each domain) to build up a lexicon and embedding model of these items on the phrase level, rather than the individual word level.

Embodiments may improve upon prior art training embedding models, such as particular uses of word2vec, which may construct a semantic profile of a word by considering the words which frequently surround it. What level of resolution to use becomes an issue (e.g. the entire document or each paragraph separately). A related problem is window size: embedding algorithms may work by taking the piece of text under consideration and sliding a 'window' over it which constitutes the actual context for each word in the window. Prior methods need to decide on an appropriate width for the sliding window. Prior art methods may input noise and junk from input sentences, e.g. "well it's just that I don't think i really need the channel that I am paying for so if possible I think we can maybe er cancel it". Embodiments may improve prior art methods to produce a cleaner, more compressed version of such text such as 'cancel the channel'. Prior art systems do not properly recognize low-frequency multi-word terms.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may create, from input data (e.g. a large number of documents such as transcripts of interactions, which may be conversations), structured and combined input samples (e.g. multiple overlapping input at different resolution levels), which may be provided to algorithms to produce embeddings for the input data. Combined input associated with or produced from a document or set of text may include, for that input, a set of, in some sense, overlapping representations of the input, all of which are used in parallel as input to an embedding algorithm. The overlapping representations can include, for example structured phrase level input, "turn" level input representing one turn in a conversation (a turn may be, e.g., one sequential in time set of words from one of multiple speakers of the conversation, beginning and ending when the speaker changes), and "call" or conversation level input (e.g. the entire interaction). A call, conversation or dialogue can be broken down into alternating 'turns' between the speakers, each of which may include multiple sentences or partial sentences.

Figure 1:
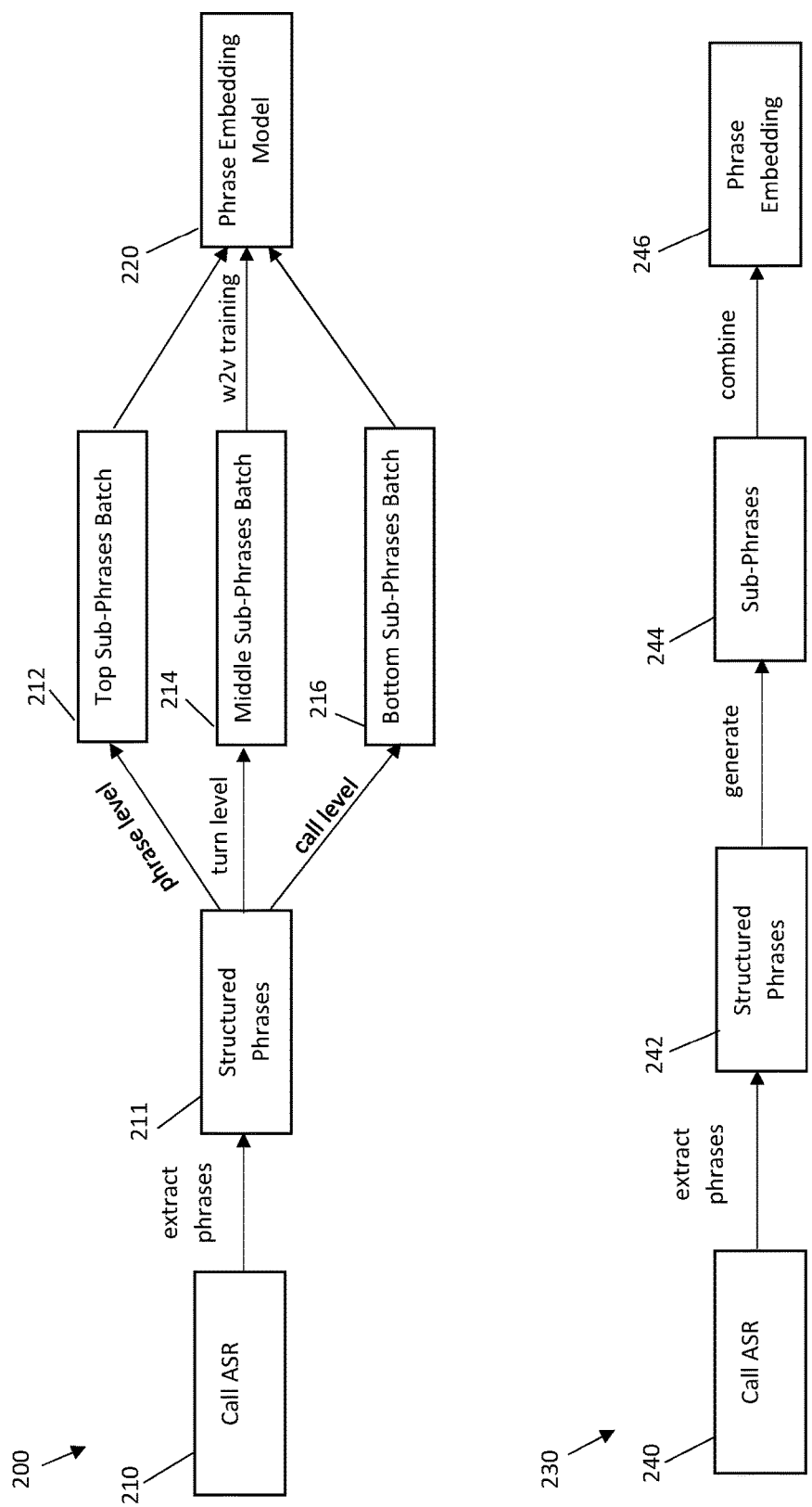
FIG. 1 depicts a sample schematic input for training and production according to an embodiment of the present invention.

FIG. 1 depicts a sample schematic input for training and production according to an embodiment of the present invention. At the training stage 200, text 210 produced by, for example automatic speech recognition (ASR, known techniques for converting audio recordings of speech to text) or text-to-speech (TTS) applied to a conversation or call may be converted to structured phrases 211. A structured call or document may be the original or raw text call transcript or document converted to a series of structured phrases. A large corpus of documents or call transcripts, for example 200,000 calls, may be used. Different levels of detail or resolutions 212 (e.g. phrase level), 214 (e.g. turn level) and 216 (e.g. call level) may be used to produce input samples for training a model 220. At the embedding, inference or production stage 230, a newly seen text 240 may have phrases extracted to produce structured phrases 242. Sub-phrases 244 and other samples may be created, and used to find an embedding 246.

Figure 2:
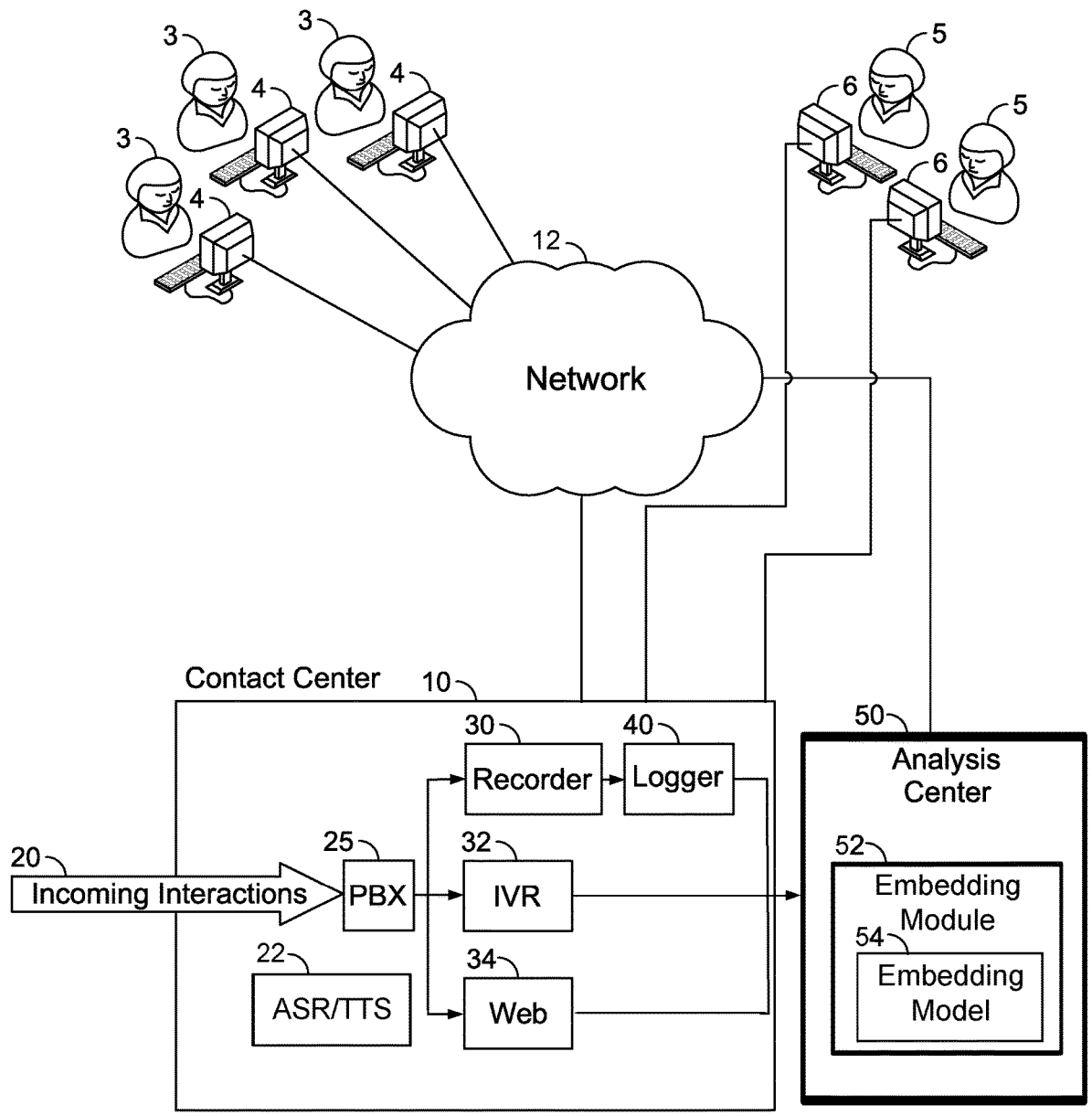
FIG. 2 is a block diagram of a system for creating and using structured phrase embeddings according to an embodiment of the present invention.

FIG. 2 is a block diagram of a system for creating and using structured phrase embeddings according to an embodiment of the present invention. While FIG. 2 shows such a system in the context of a contact center, embodiments of the invention may be used in other contexts. Incoming interactions 20 (e.g. conversations, telephone calls, IVR interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate external user equipment 4 to communicate with agents 5 via contact center 10; and agents 5 may operate agent terminals 6 for that communication and other purposes. Incoming interactions 20 may be pre-processed and may enter the system as text data, or may be converted to text via ASR or TTS module 22.

Figure 3:
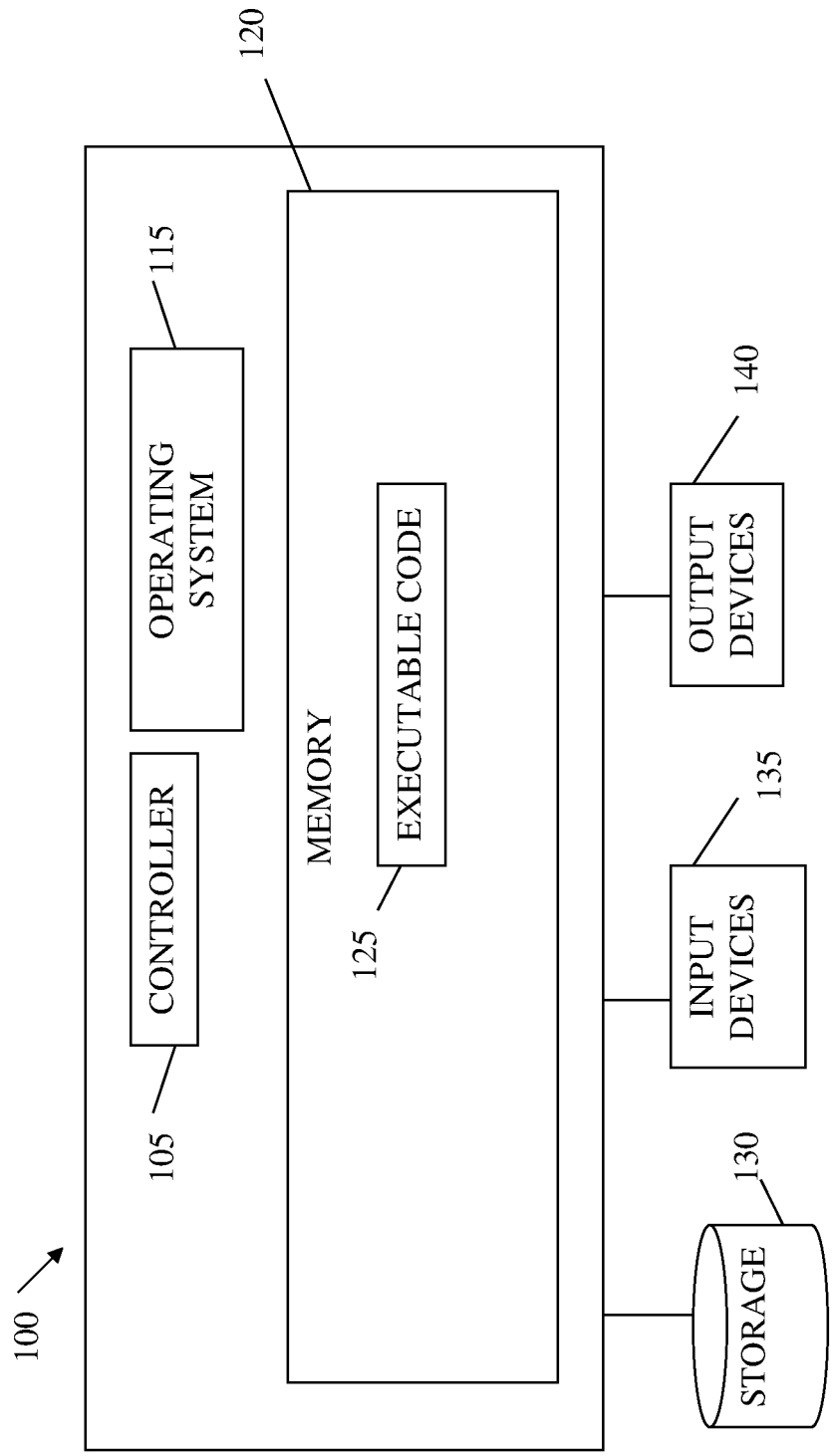
FIG. 3 shows a high-level block diagram of an exemplary computing device which may be used with embodiments of the present invention.

User equipment 4 and agent terminals 6 may include computing or telecommunications devices such as personal computers or other desktop computers, conventional telephones, cellular telephones, portable or tablet computers, smart or dumb terminals, etc., and may include some or all of the components such as a processor shown in FIG. 3.

Interaction data, text or documents, e.g. representing conversations between agents and customers, may be stored, e.g., in files and/or databases. For example logger 40 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10. A corpus of texts may thus be created and stored. In other embodiments or use cases the corpus may be different than customer-agent conversations.

Figure 4:
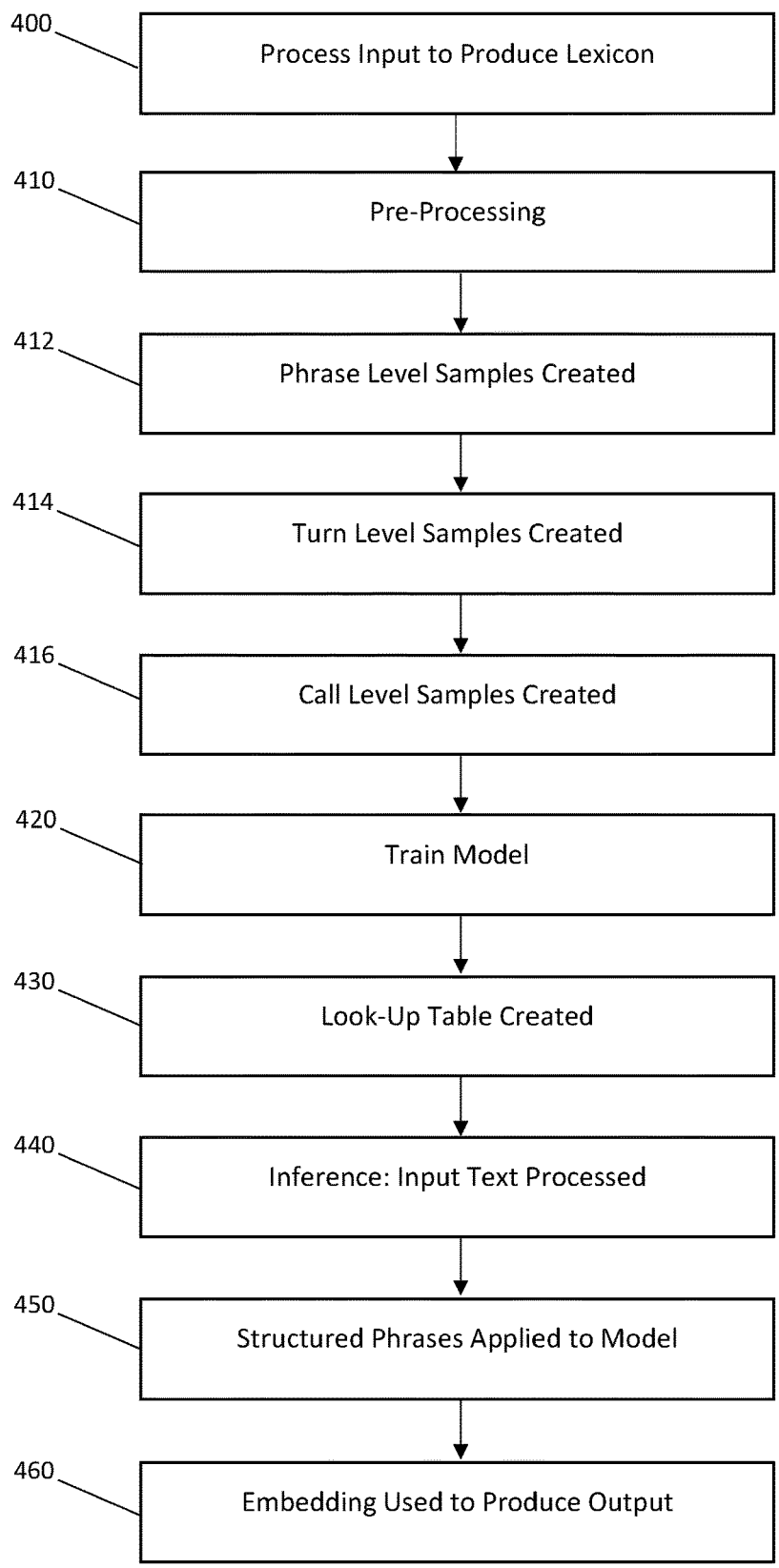
FIG. 4 is a flowchart of a method according to embodiments of the present invention.

Analysis center 50 may perform functions such as those shown in FIGS. 1 and 4, and may include for example embedding module 52 which may be or may be implemented as a machine learning or neural network algorithm, or by another system. Embedding module 52 may for example create embedding vectors. Analysis center 50 may include embedding model 54, e.g. a table including entries for tokens, words, phrases, etc., with associated embeddings created by embedding module 52, and associated weights or frequency scores. Embedding model 54 may be part of embedding module 52, or a separate unit. Analysis center 50 may communicate with for example user terminals to for example provide visualizations or the output of inference or production. Embedding module 52 may be or include a lookup-table directly mapping single tokens and (multi-word) terms to their associated embeddings, with keys of lookup table tokens and terms rather than structured phrases.

One or more networks 12 may connect equipment or modules not physically co-located, for example connecting external user equipment 4 to contact center 10, and contact center 10 to analysis center 50. Networks 12 may include for example telephone networks, the Internet, or other networks. While in FIG. 2 contact center 10 is shown passing data to analysis center 50, these modules may communicate via a network such as networks 12.

FIG. 3 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as contact center 10, ASR module 22, PBX 25, IVR block 32, voice interactions block or recorder 30, connect API 34, analysis center 50, embedding module 52, external user equipment 4, and agent terminals 6, and other modules discussed herein may be or include a computing device such as included in FIG. 3, although various units among these modules may be combined into one computing device.

Operating system 115 may be or may include any code segment designed and/or configured to perform tasks involving coordination, scheduling, or otherwise managing operation of computing device 100, for example, scheduling execution of programs. Memory 120 may be or may include, for example, a Random Access Memory (RAM), a read only memory (ROM), a Dynamic RAM (DRAM), a Flash memory, a cache memory, a buffer, or other suitable memory units or storage units. Memory 120 may be or may include a plurality of, possibly different memory units. Memory 120 may store for example, instructions (e.g. code 125) to carry out a method as disclosed herein, and/or data such as text, documents, interactions, embedding models or data, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 1 and 4, according to embodiments of the present invention. In some embodiments, more than one computing device 100 or components of device 100 may be used for multiple functions described herein. For the various modules and functions described herein, one or more computing devices 100 or components of computing device 100 may be used.

One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as embeddings, documents or interactions may be stored in a storage 130 and may be loaded from storage 130 into a memory 120 where it may be processed by controller 105. In some embodiments, some of the components shown in FIG. 3 may be omitted.

One or more input devices 135 may be or may include a mouse, a keyboard, a touch screen or pad or any suitable input device. Output devices 140 may include one or more displays, speakers and/or any other suitable output devices. Any applicable input/output (I/O) devices may be connected to computing device 100, for example, a wired or wireless network interface card (NIC), a modem, printer, a universal serial bus (USB) device or external hard drive, and may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

An embodiment may in a first stage train a model using input samples based on a set or corpus of input texts, and create, using the model, a look-up table including semantic embeddings for terms. The look up table may include frequency or Smoothed Inverse Frequency (SIF) information. An embodiment may, in a second stage, accept a new input text and use the look-up table produce embeddings of the relevant text. A SIF score may be an inverse document frequency measure; a SIF technique may include discounting the weight of a word or term according to the frequency with which it appears in a corpus (the more frequent, the less weight). Training may continue during use, e.g. after new texts are input.

Across or within transactions, an input text or documents, the same item will often appear with semantically insignificant variations (e.g. 'I want to cancel my account, 'I'm calling to cancel the account, 'I'd like my account cancelled' etc.). Thus embodiments may project these different variations of essentially the same statement onto a normalized (e.g. converted into a standard or unified form) form or structured phrase, to avoid an unnecessary explosion of the number of terms, and thus produce a thinning out of their occurrences. An increase in occurrences may adversely affect the training of such an embedding model. This is especially important for representations of spoken conversations, which are, by nature, more noisy and unstructured, increasing the need for some sort of normalization and structuring. A side effect of the use of such structured phrases may be the stripping out of such conversational noise. By extracting data into structures to produce what is termed herein normalized structured phrases from a text or call transcript, and using these as basic units or building blocks, embodiments may simultaneously improve embedding and solve the various problems described herein. Words may be brought together in a normalized structure regardless of the variations in the original sentence structures (e.g., "i finally paid the bill for the two months of January and February" and "i got the bill for the two months of January and February finally paid" may both be normalized to ["i", "pay", "bill", "for" "month of January and February", "finally"]). Well-defined structures used with some embodiments may have the part-of-speech of each component part known, which may allow embodiments to "mix and match" various well-formed sub-terms (e.g. 'i pay bill', 'pay finally', 'bill for month of January' etc.) and feed them to the training algorithm to ensure they all get associated with each other simultaneously (e.g. both the phrase with its sub-terms, and the sub-terms between themselves). Each sub-term may include one or more words and may be created by selecting and concatenating varying subsets of the slots of the structured phrase.

Multiple variations of the same term (e.g. having the same key lemmas, after articles, prepositions, pro-nouns, etc. and also word order are discounted) may be projected into fixed or pre-defined structures or frames, e.g. to produce normalized structured phrases, which can be used for training an embedding model directly as phrases, using for example the word2vec algorithm (which ordinarily takes individual words or 'tokens' as input samples), alleviating or lowering the need (though possibly not eliminating it) to construct the phrase embeddings by combining the embeddings of constituent words. The normalized structured phrases may form their own input window to a model. Tokens may be the individual pieces into which a text is broken for processing; a token is typically but not always a word.

A lemma for a set of words may be the canonical form, dictionary form, or citation form of a set of words (e.g. 'pays', 'paid', 'paying' all have the same lemma of 'pay'). Before being entered into structures words may be lemmatized: to lemmatize a word may include to convert it to the canonical form. The phrases themselves may include or form a natural context window for the individual words and sub-phrases that they contain, alleviating the need of choosing an arbitrary width for the context window (prior art systems typically use a width of between 2 and 10). Embodiments may take further advantage of that these structured phrases are typically grammatically well-formed (e.g., where each slot in the frame has, can accept only, or is associated with a known part-of-speech), to greatly enhance the quality and robustness of the phrase embeddings through a process of 'well-formed sub-phrase extraction' and working at different and overlapping detail or resolution levels of the text. There are many use-cases in the world of text analytics where having an accurate and robust semantic model at the phase level is useful, such as keyphrase extraction, event extraction, information retrieval, text summarization and others.

Training and inference or use may be performed using a combined set of data or input samples derived from the same input text (e.g. conversation transcript), each set of data at a different resolution level. Inference may be the process of using a trained model to derive the relevant value (e.g. embedding) for a new item (including those not seen in the training corpus). In embodiments of the present invention, inference using a model may occur to create a table, which may in turn be used during production or inference to determine embeddings for tokens or terms.

In one embodiment three levels may be used, but other or different levels may be used. For example, a phrase level, turn level, and call level may be used, where at each of the phrase, turn and call level input samples may be created using resolution or detail levels different from the input created at the other levels. At each level the amount of text used for input to create samples may be different (e.g. at the phrase level, text from one structured phrase at a time is used, and each different phrase is used in isolation to provide input; at the turn level, text from one speaker turn at a time is used, from one or more structured phrases, and each different turn is used in isolation to provide separate input; at the call level all the text in the call, all turns, is available to produce an input), and at each level the resolution may be different. Input data to a model, and also input data during inference, may be created from each of these different levels.

Resolution or detail in the context of producing training samples may refer to the number of different types or coverage of samples used at each level. Each level may augment the training of the other level.

Each of the various levels or resolutions may have a different precision/context trade-off, for example:
At the individual phrase level (high precision or resolution, less context)
At the sentence/speaker-turn level (medium precision or resolution, medium context)
At the call level (lower precision or resolution, maximum context)

Each level or resolution may produce one or many input samples, which may be used to train a model, e.g. word2vec. After training, the resulting semantic embeddings from the model may be placed in a look-up table for production or inference time.

For example, automatic speech recognition (ASR) may be performed on a call or interaction to form an input text, and from this data structured phrases may be extracted. From this data, a sub-phrase batch at a phrase level may be combined with a sub-phrase batch at a turn level and a sub-phrase batch at a call level to train an embedding model using a set of input samples. During inference or embedding, ASR may be performed on a call or interaction, and from this data phrases may be extracted to produce structured phrases; sub-phrases may be produced, and embeddings may be produced on the sub-phrases.

Prior to training, and/or prior to inference, a conversation, call or interaction, or other document, may be processed using different operations, for example phrase extraction (e.g. converting an original text to a structured text or call), speaker turn structuring (creating or marking a sequence of speaker turns, or the ordered sequence of structured phrases extracted from each alternating speaker turn), and sub-term creation. Not all of these operations need be used. A sub-term may be one or more words or terms. Input text may be generated for each conversation, call or interaction. A training process may include for example phrase extraction; turn structuring; sub-term creation; and training using for example an ML algorithm.

Prior to training, a set of multiple input texts may be processed to allow training at the various resolution levels (e.g., phrase, turn and call resolution levels): for each text or transcript, tools such as a dependency parser and/or operating based on rules may be used to create a structured text including information identifying or grouping text into turns (e.g. who has spoken which text). The structured text may include a sequence of turns, each of which is a sequence of normalized structured phrases.

After grouping text to turns, if performed, the text may be converted to structured phrases. In some embodiments, multiple different input text strings may each be represented as the same structured phrase. Each structured phrase may be stored, for example, as a tuple or named tuple. From the structured input texts, a lexicon or term lexicon may be built.

A lexicon or term lexicon may be built by passing each structured phrase produced for the structured calls through sub-term generation, calculating or accumulating the frequencies of each token, and calculating a SIF score for each token or term. For each structured phrase in each text, sub-terms may be generated, and terms and sub-terms (possibly normalized) may be added to the lexicon and/or used as training input. For each entry for each term or sub-term in the lexicon (e.g. stored as a look-up table) information such as frequency and a SIF or other score may be entered. From this table, training samples may be built. The input samples may be used to train a model, and from the model embeddings for each entry (e.g. term, sub-term) in the table may be determined and added to the table. During inference, or embedding inference, when a new text is received, similar processing may be performed (e.g. using a dependency parser) to create a structured text, and the produced components may be input to the look-up table to produce embeddings. The final embedding of a term or structured phrase after embedding inference may be a weighted combination of its own looked-up embedding, together with the looked-up embeddings of sub-terms of the term or structured phrase.

Phrase extraction or creation from input text or conversations may be performed both at training and inference/embedding. This may include parsing and structuring a piece of text (e.g. a sentence, a paragraph, or an entire document) with the aid of a dependency parser (e.g. the Spacy parser) together with processing logic, into a sequence of structured phrases. This may be 'normalized' phrase extraction in the sense that the fixed nature of the structured phrase slots, together with the lemmatization, may ensure that various input sentences, despite having different word order and/or inflections, will be mapped to the same structured phrase (and thereby 'normalized'). Different sentences may be parsed and transformed into the identical structured phrase.

During phrase extraction, the original text or call transcript may be processed for example by a dependency parser and part-of speech-tagger (such as the spaCy natural language processing system), and then processed to restructure and simplify the text or sentences into fixed or specific grammatical frames or structures, termed herein 'normalized structured phrases'. In one embodiment, normalized structured phrases that are verb phrases and normalized structured phrases that are noun phrases may be used, but other types of phrases may be used. Each structured phrase may include one or more, or a set of, fixed positions or slots, each position or slot associated with, corresponding to or including a part-of-speech or grammatical role. Each slot may include zero or more lemmatized tokens (e.g. words). A phrase-part may the components of one slot of a phrase; phrase tokens may be all the tokens in the phrase. A "flattened" phrase is the set or list of the tokens within the phrase, without the structure of that phrase. A term may be a self-contained semantic unit including multiple tokens from a phrase.

A sub-term may be a term whose tokens are all contained in a larger term. For example, 'new remote control' is a sub-term of "new remote control for cable box". A sub-term need not be contiguous with respect to the containing term, for example "technician to install new router today" is a sub-term of (the complete-term) "technician not able to install new router for home wifi network today". Sub-term generation may include generating all the (semantically meaningful or grammatically well-formed) sub-terms from a given structured phrase. Parts-of-speech with a phrase may be utilized for the purpose of appropriately combining the various phrase parts. A phrase part may be one of the constituents of the phrase, each phrase part corresponding to one slot; e.g. for the phrase including the following four entries in each slot: "new", "remote control", "for", and "cable box", each of these four is one of the four 'parts' of the phrase. Phrase terms may include all the tokens, sub-terms and the complete term extracted from a structured phrase through the process of sub-term generation. A complete term may be the concatenation of all parts of a phrase into a single term.

Sub-term generation may produce combinations of tokens from a structured phrase preserving the order of tokens the phrase, with some limitations to reduce non-useful terms: for example, only grammatically well-formed or syntactically correct terms may be produced. Each sub-term combination may include tokens corresponding to a sub-combination of slots (e.g., not all the slots) in a structured phrase. Parts or speech or slots from the phrase, or a pre-determined set of combinations of such slots, may be used to decide what combinations are grammatically well-formed and hence semantically meaningful. For example, combining only the contents of the 'subject' and 'verb' slots ('he cancelled') would leave a semantically meaningful term despite omitting the object ('the account'): this may be a grammatically well-formed term. A not grammatically well-formed term may be for example the result of combining only the 'subject' and 'negation' slots ('he not') or the 'subject' and 'preposition' slots ('he in'), and thus may not be used. Different implementations may choose which are well-formed and which are not. A pre-defined set of combinations of slot combinations may be used to create well-formed terms or combinations.

A structured verb phrase may include the following example fixed parts; other fixed parts may be used. If an embodiment uses fixed parts, not all of which need be present or filled for each sentence or text sequence, e.g., some entries may be required and others optional, thus structured phrases of the same type may each have certain entries or slots blank, such that which entries are blank differ between filled-in structured phrases:

[subject]
[negative]
[aux] (e.g., want to, need to)
verb
[object]
[preposition]
[prepositional-object]
[adverb]

In the structured phrase depiction above and below, slots described by [bracketed] parts of speech are optional, and non-bracketed parts of speech describe compulsory or mandatory slots, where the structured phrase requires an entry.

The parts may be converted to lemmatized form as an additional normalization step to keep the number of terms as small as possible, so that their occurrences reinforce each other rather than allowing them to thin out (at the possible cost of some small loss of nuance as a result of the lemmatization).

A structured noun phrase (for cases where no verb is present) may include the following example fixed parts; other fixed parts may be used:

[preposition]
[adjective1]
noun1
[connector]
[adjective2]
[noun2]

An example of a noun phrase is on|first|day|of|next-|month. In one example, the input sentences "I could not pay all the invoices for the last month yet" and "I still have not gotten my invoice for the last month paid" are both converted to the structured normalized noun phrase I|not|pay-|invoice|for|last month. In such a manner equivalent variations, in the input text, of a phrase may be mapped onto a fixed normalized structure. Phrase level resolution input samples may use such structured phrases and may not need a sliding window for input to a training or inference process.

If the text is a multi-party conversation, the text, e.g., a call, may be hierarchically decomposed into a sequence of speaker 'turns' (e.g. agent turns and customer turns in a two-party agent-customer conversation), and each turn may be converted into a sequence of structured (e.g. verb or noun) phrases. For example, a call may be structured into utterances, each utterance assigned to a turn associated with one of the call participants, each utterance including one or more structured phrase(s).

Sub-terms may be generated or extracted from each single structured phrase during the processing of an input text. Since the parts-of-speech of the different slots, positions or entries in the structured phrase is typically known, a process may extract grammatically well-formed sub-terms from the structured phrase, e.g. by using the contents of selected sub-set of combinations of slots from each phrase such as subject+verb, verb+object, verb+preposition+prepositional-object. This may effectively multiply the number of terms available for training, and also during the inference stage for added robustness. For example, from the single structured phrase, which includes parts of speech in parentheses associated with each slot: I (subject)|not (negative)|pay (verb)|invoice (object)|for (preposition)|last month (preposition object), the following example normalized sub-terms may be generated, and associated with the structured phrase (the following is a partial list of possible sub-terms):

Pay
I pay
Not pay
I not pay
Invoice
Pay invoice
I pay invoice
I not pay invoice
Last month
For last month Typically, each slot or position in the set of slots in the structured phrase can accept and is associated with only a certain part of speech. A part of speech may be a category of words or lexical items that have similar grammatical properties. Parts-of-speech may include, for example, noun, verb, adjective, adverb, pronoun, preposition, conjunction, connector, negative, aux, interjection, numeral, and article, but other parts-of-speech may be used.

After a document, call, interaction, etc. is processed, training input samples may be constructed or extracted from the resulting hierarchical structure of the input text or calls to be inputs to the embedding (e.g., word2vec) training. The input samples may be constructed at overlapping or combined levels of resolution, for example three levels: phrase, speaker turn, and entire call, with one or more data sets being constructed at each level, where each resolution level determines what is to be considered an independent unit of text. Other resolution levels and numbers of levels may be used.

Each of the several inputs that are created, e.g. tokens, multi-word parts, etc., may be used separately to train the text or phrase embedding model: for example, the model may be trained on word parts, the model may be separately trained on multi-word parts. Thus the model may be trained on overlapping sets of data, the same word or phrase being used multiple times in different levels to train the context, in conjunction with different other words or phrases.

At the phrase level, multiple sets of data may be created or extracted, each from one structured phrase without considering as input text surrounding that phrase, for example a) individual phrases, e.g. the entirety of the phrase; b) "sub-parts", preserving multi-word parts, or all the words within a slot in a phrase (e.g. phrases that commonly include more than one word, such was last month) but producing a sample with less than all words in a phrase; and c) token and sub-term combinations (e.g. multi-word combinations which across slots in a phrase but which are not the entire phrase, such as "not afford high prices"), typically with less than all words in a phrase. Other or different data may be created or extracted at the phrase level. At the phrase level, the original call or text is viewed as a flat sequence of structured phrases, and each phrase encountered is viewed as an independent unit of text (e.g. disconnected from the other phrases in the call and even from those in the same speaker turn), from which training samples may be created in three ways. In other embodiments other numbers and types of data categories may be created at the phrase level.

At the token level at the phrase category, each structured phrase may be 'flattened' out into a sequence of its individual tokens (e.g. words). Flattening refers to whether a training sample includes single words—flattened—or whether it retains the multi-word terms from the structured phrase—not flattened. Since each of these resulting token sequences is treated as a complete 'text', and since the number of its tokens is relatively small (e.g. in the examples shown herein there is a maximum of 8 'slots' which can be filled, and each slot will typically not contain more than 2 or 3 tokens, so typically there will be less than 10 tokens in total), a process may not require a sliding context window of some arbitrary size as is used in the prior art, since the phrase itself constitutes a natural cohesive context window within which each token is contextually related to the others. This sequence of phrase tokens may become a single training sample for the embedding (e.g., word2vec) algorithm, with a single context window spanning the entire sample. Its cohesiveness may result in a high quality and precise embedding for each token. For example, if a certain phrase is I|not|pay|invoice|for|last month, which forms its own natural cohesive window, the set of tokens extracted may be "I", "not", "pay", "invoice" "for", "last" and "month".

The token level in the phrase resolution may make use of the structured phrase for the purpose of providing a natural context window, but it operates on the level of individual tokens. At the multi-word parts at the phrase category, an embodiment may train multi-word terms directly into the embedding model. This may make use of this aspect of the structured phrase, where a slot may contain a multi-word term serving a well-defined function (e.g. subject, object etc.) within the overall phrase e.g. 'cable tv service' or 'channel selection'. For example, if a certain phrase is I|not|pay|invoice|for|last month, the set of tokens extracted may be "I", "not", "pay", "invoice" "for", and "last month": "last month" is preserved as "last month" instead of being broken into tokens "last" and "month". Each phrase is treated as a complete text, a single context window is used which spans it completely, but now, instead of flattening it into individual tokens, a process preserves each part or slot as-is. This way, a process constructs training samples containing multi-word terms (not necessarily only multi-word terms, since some slots may contain single tokens) and these terms may be associated with their surrounding terms and/or tokens during the training process, thereby producing embeddings for these terms directly. For example, in the structured phrase "I|cancel|subscription|to|cable TV service" the term 'cable tv service' may be associated with its contextually related tokens 'subscription' and 'cancel'. At the token and sub-term combinations level at the phrase category, the technique of 'sub-term extraction' may be used to generate all possible tokens and terms from a single structured phrase. Each phrase may be considered as a separate unit of text and may be a single cohesive context window. Multiple benefits may occur: the resulting training sample may contain all the individual phrase tokens, all the built-in multi-word phrase parts, and in addition, all possible grammatically meaningful sub-terms. Grammatically or semantically meaningful is used to distinguish this from the cruder method of simply generating 'n-grams', which may include noise and carry less meaning. An n-gram may be a contiguous sequence of n tokens extracted from a given sample of text.

By generating more than one type of training sample at the phrase level (and typically at other levels), not only will, in this specific example, the term 'cable tv service' be trained (e.g. semantically associated in a model) with 'cancel' and 'subscription', but also with its own constituent tokens: 'cable', 'tv' and 'service', and also with newly generated sub-terms such as 'cancel subscription' (e.g. created by combining the verb and object parts of the phrase), and 'subscription to cable tv service' (created by combining the object, preposition and preposition-object parts) etc. In some embodiments, all tokens and sub-terms in the structured phrase (both those explicitly built-in as phrase parts and the new tokens/terms generated by either combining or splitting existing parts) may become semantically associated with all the other tokens and sub-terms (including their own constituent tokens) contained in the original structured phrase, in addition to the entire phrase itself ('i cancel subscription to cable tv service').

Input data or samples to a model, and also input data during inference, may be created also at the speaker turn and call levels, e.g. from the same input text used to create data at the structured phrase level. At the phrase resolution level each phrase may be taken separately (e.g. disconnected from the speaker turn and call in which it appears) and treated as an independent piece of text for input samples. The advantage of this may be that samples include knowledge that the parts of the phrase are, by definition, closely related to each other, and so their being associated with each other in training will result in high quality and precision embeddings. However, if a system were to completely ignore the other phrases appearing in the same call and, even more so, the surrounding phrases in the same speaker turn, training may lose relevant and related context due the inter-phrase relatedness, which could greatly enrich the embeddings. Therefore, in addition to the phrase level resolution, embodiments may also create training and inference input samples at the speaker turn and call resolutions, where there is a tradeoff of some precision for a broader and richer context. Turn level resolution input samples may use a different level of resolution than at the phrase level; turn or call level resolution may use a sliding window for input to a training or inference process. Each level may address a different precision/recall tradeoff proportion.

At the call and turn resolution levels there may no longer be a natural context window as with the phrase level, so these levels may need to employ a regular sliding context window, but also still able to use the structured nature of the phrases in the sequence to construct multiple training samples from the same text, processing the text in certain manners.

In some embodiments, at the turn level, turn input samples may be created including only input from a single turn from a source text, samples being formed by removing structure from structured phrases. At the call level, call input samples may be created from the input text, each call input sample comprising input from more than one turn within the text. At the turn level, one input sample may include text from multiple phrases within a turn, in contrast with the phrase level. A sliding window of a certain size (e.g. 10-15 individual input items such as tokens; other sizes may be used) may be applied to the call level input and if needed turn level input to provide input to the model. At the call level, one input sample may include text from multiple turns, and multiple phrases, in contrast with the turn and phrase levels.

In one example, at the phrase level, a number of different input samples may be created from each structured phrase (with the samples for each phrase limited to the text of that phrase) and used as input samples, for example: entire structured phrases ("preserve structure"); tokens ("flattened tokens"); sub-parts or multi-word parts, with all words in a slot; and sub-term combinations with combinations of words across slots but with less than all words in a phrase, may be used. At the turn or speaker-turn level, the set of words used for one sample is not limited to one phrase, and a number of different samples may be created using more than one phrase at the token level by, for each term (with the samples for each turn limited to the text of that turn) flattening structured phrases, samples with multi-word parts of the phrase preserved; phrase parts; and speaker-turn level terms, a sequence of all the tokens, terms and sub-terms obtained by the process of sub-term generation on each of the structured phrases in a given speaker turn. At the turn level, the model may be trained with inter-phrase relationships, as each sample may be created from more than one phrase within a turn.

At the call level, the set of words is not limited to a phrase or to a turn, and a number of different samples may be created using more than one phrase including, as one example, tokens (e.g. an ordered sequence of all the tokens from all the flattened structured phrases of all turns in the sequence of speaker turns of the given call; the ordered sequence of all the tokens contained in the call); and phrase parts (e.g. an ordered sequence of all the phrase-parts of all the structured phrases of all the speaker turns in a given structured call; the ordered sequence of all the phrase-parts contained in the call). The resulting samples may be fed to a model using a sliding window. At the call level, the model may be trained with inter-turn relationships, as each sample may be created from text from more than one turn. For example, a set of samples at the call level may include training samples by joining all the tokens of the phrases, which includes less detail and resolution than at the phrase level, phrase parts; and complete-terms (in other embodiments other inputs may be used at the call level), with a sliding window used across the input.

Resolution or detail may differ among levels in different ways. For example, 'complete-terms' (the concatenation of all parts of a phrase into a single term) may be used only at the call level, may differ from input using '(all) terms' (including all possible sub-terms) which may not be generated at the call level, but rather in one embodiment only at the phrase and turn levels. Phrase and term "term" input may differ in that the unimportant tokens may be omitted from the turn level. Term input at the turn level may include "all" terms, a sequence of all the tokens, terms and sub-terms obtained by the process of sub-term generation on each of the structured phrases in a given speaker turn; possibly with selected non-important terms (e.g. a pre-defined list) omitted at the turn level.

'Important' may be in the semantic sense (e.g. topic relevancy or even based on a SIF or TF-IDF (term frequency-inverse document frequency) based measure). Important may be a measure of important/unimportant parts-of-speech, as labelled in each slot of the structured phrase, and which is deterministic. Unimportant POSs may include for example:
- articles ('a', 'an', 'the'),
- pronouns ('I', 'me', 'you', 'they', 'them' . . . ),
- prepositions ('in', 'on', 'with', 'at', 'for' . . . ),
- conjunctions ('and', 'or', 'but' . . . ),
- demonstratives ('this', 'that' . . . ),
- possessives ('my', 'mine', 'your' . . . ),
- questions ('what', 'why', 'when', 'how' . . . )
- quantifiers('any', 'all', 'each', 'several',)
- auxiliary verbs ('could', 'would', 'should', 'will', 'must', 'want to', 'need to', 'try to' . . . )

Embodiments may use a short list (e.g. 100 words) of 'stop-words' words (ubiquitous words) labelled as unimportant, such as the various inflexions of the verb 'to be' ('is', 'are' . . . ) 'to have' ('has', 'had' . . . ), 'to get', 'to say', common adverbs such as 'usually', 'actually' etc.

Each training sample may include a sequence of elements, where the nature and makeup of each element is determined by for example factors (other levels and factors may be used):

Resolution or Detail Level: for example call/speaker-turn/phrase

Element Type: for example tokens/phrase-parts/all-terms

In one example, each training sample in the training set will take one of the following forms (other specific forms may be used), with references numbers at the beginning of each line denoting a "type" used in an example below:
(1.1) phrase(-level) tokens;
(1.2) phrase(-level) parts (a phrase part being a full entry for a slot in a structured phrase);
(1.3) phrase(-level) terms or phrase-parts (including tokens, sub-terms and complete terms);
(2.1) speaker-turn-level tokens including only "important" or excluding selected unimportant tokens;
(2.2) speaker-turn-level phrase-parts (again including only important; or minus selected non-important tokens);
(2.3) speaker-turn-level terms ("all" terms, including only important; or minus selected non-important tokens);
(3.1) call-level tokens (again including only important; or minus selected non-important tokens);
(3.2) call-level phrase-parts (again including only important; or minus selected non-important tokens); and
(3.3) call-level complete-terms (again including only important; or minus selected non-important tokens).

For example, given the following extract from a structured call in Table 1 below, where entries such as "['i', 'want to', 'cancel', 'account']" are structured phrases created from raw call text:

TABLE 1

Call: [
  Speaker-Turn 1: [
    ['i', 'want to', 'cancel', 'account'],
    ['i', 'not', 'afford', 'high price'],
    ['i', 'find', 'cheaper deal', 'at', 'another company'],
    ['they', 'have', 'better customer service']
  ],
  Speaker-Turn 2: [
    ['hold', 'line'],
    ['i', 'want to', 'check', 'for', 'you'],
    ['thank', 'you', 'for', 'wait'], TABLE 1-continued

['i', 'speak', 'to', 'loyalty department'],
    ['we', 'can', 'offer', 'discount']
  ]
  ....
]

Then the training set will include the following training samples (their types are in brackets at the end of each line):
- 'i', 'want', 'to', 'cancel', 'account' [1.1]
- 'i', 'not', 'afford', 'high price' [1.2]
- 'i', 'not', 'afford', 'high', 'price', 'high price', 'not afford', 'afford high price', 'i not afford', 'not afford price', 'not afford high price' etc. . . . [1.3]
- 'cancel', 'account', 'not', 'afford', 'high', 'price', 'find', 'cheaper' 'deal', 'another', 'company', 'better', 'customer', 'service' [2.1]
- 'cancel', 'account', 'not', 'afford', 'high price', 'find', 'cheaper deal', 'another company', 'better customer service' [2.2]
- 'cancel', 'account', 'afford', 'high price', 'find', 'cheaper deal', 'another company', [3.1]
- 'better customer service', 'hold', 'line', 'check', 'wait', 'speak', 'loyalty department', 'offer', 'discount' [3.2]
- 'cancel account', 'not afford high price', . . . 'speak to loyalty department', 'offer discount' [3.3]

Note that in labelled examples 2.1, 2,2, 2.3, 3.1, 3.2, 3.3 the less important tokens or terms (e.g. pronouns, prepositions, auxiliary verbs etc.) may be omitted to bring the more significant terms closer together, allowing them to be caught in the same 'sliding context window'. This may result in the turn and call levels having resolution or detail different from the turn level: there may be a difference between the way tokens are created at the phrase level (all tokens) versus other levels (only important tokens), beyond that there may be a difference as a result of the different input.

In addition to defining samples using categories such as phrases and sub-parts, other differences may exist when creating samples at different resolution levels. For example, at the turn level, the terms may be trimmed, so that all non-essential tokens (pronouns, auxiliary-verbs) are discarded, leaving a more compressed training sample such as:
'cancel', 'account', 'cancel account', 'not', 'afford', 'high', 'prices', 'high prices', 'not afford', 'afford high prices', 'not afford prices', 'not afford high prices', 'found', 'cheaper' 'deal', 'cheaper deal', 'found cheaper deal', 'at another company', 'deal at another company'

Likewise, at the call-level, an embodiment may not perform generation of 'sub-terms' at all, and training samples may be based only on single-tokens, original multi-word parts, and fully-joined phrases.

While phrase, turn and call levels are used as examples, other resolutions and other numbers of resolutions and levels may be used. While certain data being used as samples is described for each of the three levels, different data may be used, e.g. sub-terms and sub-parts may be used at the turn level.

After training samples are developed at various levels and resolutions, e.g. phrase, turn and call levels (other levels may be used, and not each of phrase, turn and call levels need be used), the input samples may be used to train an embedding model, or if the samples were produced from a new input text to be analyzed, to conduct inference (e.g. "production time") to produce embeddings. An algorithm such as word2vec may generate an embedding model by iterating over each training sample in the training set and learning to associate neighboring elements (e.g. tokens or terms as per the type of training sample) as being semantically related. 'Neighboring elements' may be those elements (e.g., tokens or terms) within a certain distance of each other measured typically in tokens or words, as defined by the width of a 'sliding window' which traverses each training sample in the course of training.

While during training the model may be a NN, after training the outputs for each input item from the model may be placed in a look-up table such that the model is structured as a look-up table, allowing looking up a word or phrase as in a dictionary. Thus certain words or phrases used for training may not appear in the model in its look-up table form if the embedding for that word of phrase is less than a threshold.

Some embodiments may improve the technologies of automatic text processing: by trading off narrow-context, high-precision against wide-context, lower-precision at the different resolution levels, together with the construction of multiple types of training samples within each level (allowing individual words, multi-word terms, multi-word term combinations and complete phrases to be semantically associated with each other, in various mixes) a rich and complementary set of training samples may be generated from the original text, resulting in a rich embedding model with both single-word and multi-word terms built-in. In addition the use of multiple types increases the occurrence of certain terms in the training set, since, sub-term generation may actively generate non-contiguous terms, rather than requiring the term to appear in the corpus as-is. Since an embodiment may create separate training samples from both tokens and terms (and, in the case of phrase(-level) terms they may both appear in the same training sample) from the same structured phrase, the problem of 'losing' the tokens for the sake of joining them into may be mitigated Taking the example of the call in Table 1 herein:
From the training sample of type 1.1 the training algorithm will learn to associate the words 'cancel' and 'account'.
From the training sample of type 1.3 it will learn that 'cancel' is also related to the terms 'want to cancel', 'cancel account', 'want to cancel account' etc.
From the training sample of type 2.1 it will learn that 'cancel' is also related to the words such as 'price', 'cheaper'.
From the training sample of type 2.2 it will learn that 'cancel account' is also related to the terms 'high price', 'cheaper deal' 'another company'.
From the training sample of type 2.3 it will learn that 'cancel account' is also related to 'not afford', 'not afford high price', 'find cheaper deal' 'cheaper deal at another company'
From the training sample of type 3.1 it will learn that 'cancel account' is also related to the words 'loyalty' and 'discount'.
From the training sample of type 3.2 it will learn that 'cancel account' is also related to the 'loyalty department'.
From the training sample of type 3.2 it will learn that 'cancel account' is also related to the complete-terms 'not afford high price', 'find cheaper deal at another company', 'speak to loyalty department', and 'offer discount'.

By creating multiple training samples at different resolutions and of different types, mixing and matching tokens and terms, within the same phrase, across phrases within the same speaker-turn, and across speakers-turns, an accurate, rich and high quality phrase embedding model may result.

The result of training may be a model, typically a table, with terms and sub-terms as look-up entries or index entries, and for each entry an embedding (a vector or series of numbers), and a SIF score or other frequency measure. Some terms from the training corpus may not be in the model, e.g. if they are newly seen and not in the corpus used to train the model, or if their embedding was below a threshold. If a term or sub-term input into the table-form model is in the model, it may take the embedding from the model directly (from the entry corresponding to the input). If the input term or sub-term is not in the model, an embodiment may 'fall back' on a weighted average (e.g. using a SIF score) of the constituent tokens of the input, or at least those tokens that are in the model. In one embodiment, to obtain an embedding of a multi-word term from the look-up table model, the embedding in the table (if any) for that multi-word term may be mathematically combined with embeddings from the table of all constituent terms of the multi-word term, using weightings (e.g. SIF scores). An improvement over prior art technology may result from that, even when a term is found in the phrase embedding model during embedding lookup as-is, a process may still perform the full process of embedding inference to add extra robustness. This is especially important for longer terms, which might not have appeared in the corpus with sufficient frequency to get an intensive training, but when supplemented by their shorter sub-terms (which appear with greater frequency) their final inferred embeddings may be more robust.

Performing inference to find a word embedding, may be using a look-up table filled in using inference, where the input text for which embedding is desired is first processed to produce a number of sub-terms, each sub-term including one or more words, and applying each sub-term to, or looking up an embedding corresponding to each sub-term in, an embedding model (e.g. as embodied in a look up table) to produce for the sub-term an associated embedding. The sub-terms may be generated from structured phrases as discussed elsewhere herein, and thus the input may be converted to one or more structured phrases as an initial step of processing of the input text.

For a phrase occurring within the input text, an embodiment may produce an embedding based on a weighted combination of the sub-terms within the phrase, each weight being based on a SIF measure or other weight for the sub-term associated with the weight.

In some embodiments at the inference stage, input from a newly seen (e.g. not used for training) input text may be processed into structured phrase(s) as discussed herein, and then for each or for a certain set of structured phrases, for each phrase, sub-terms may be created, and an embedding using the trained phrase embedding model may be determined for the phrase, e.g. using a look-up table, based on the sub-terms.

Resolution levels may relate to the creation of the training samples if input is not a document as used during training. At inference, input may be only a snippet of text to be analyzed, not an entire call, in which case call-level, turn-level and phrase level has no meaning during inference. If inference input is a single sentence, it may be processed into a sequence of structured phrases: a sentence can consist of more than one phrase.

Phrase embedding inference may be performed for all structured phrases created from a given piece of text (e.g. a call transcript, or a paragraph, or speaker-turn, an individual sentence, or a part of a sentence). Where the input is an entire call, the raw transcript may be first transformed into a structured call through phrase extraction as in a first part of the training stage described elsewhere herein. Then, to infer the phrase embedding of each structured phrase, sub-term generation may be performed on each one. Embedding lookup and SIF or other weight lookup may be performed on each of these phrase terms. The sum of these embeddings, weighted by the corresponding SIF or weight, may provide the final phrase embedding. For each phrase an embedding may be based on a weighted combination of the embeddings of its sub-terms, the weight of each sub-term being based on for example an inverse frequency measure such as a SIF score or other score. In some embodiments at the inference stage, input from a newly seen input text such as a call transcript may be, rather than text across the entire text, only the sample portion relevant to the query, e.g. the portion of the text being searched for. Alternately, inference input be processed and provided as input to an embedding model in the same manner as during training (e.g. providing input at different resolutions for each of a phrase, turn and call level). In some embodiments, creating input based on a new text at inference or production may include repeating this extracting and combining sub-terms to create the embedding of a phrase from a target text, which may add precision and robustness to the result embedding. For example, if at inference a new text has the phrase 'i want to order a new card', even if this phrase appears 'as is' in the model, it might not have appeared with sufficient frequency in the training corpus for its embedding to have the highest quality. By combining the embeddings of the full phrase 'I want to order new card' with 'order new card', 'order card', 'new card', 'want to order', 'card', 'order', etc. which also appear in the model, may result in a more accurate and robust embedding when input at inference.

In typical inference, to find word embeddings, once a model has been trained, the inference stage applies or provides input to the model (e.g. a word2vec model) to find the embedding of a given word or set or string of words in the model. To calculate the embedding for a phrase, the embeddings of its constituent words have been, in the prior art, combined in some way, e.g. concatenated, and applied or provided to the model.

The embeddings or text output at inference may be used in various manners. For example, an input text which is a call transcript may be input to a model trained as described herein, and the output may be used to provide to a user the "issues" of the call (e.g. "hardware & equipment"), the topic categorization of the call (e.g. "billing"), and to provide a call transcript where terms or phrases that are related are displayed in the same color, the color being the same as topics or issues listed which are also displayed in color.

Determining the semantic meaning of the phrases within an input text (by the phrase embeddings) can be used for modelling which topics are mentioned or discussed in the text.

In some embodiments of the present invention, a hybrid approach may be used with a model already trained using multi-word phrases (e.g. such phrases built-in), using a linear combination of embeddings from the model to calculate the embedding of a given newly seen multi-word phrase. This may be more needed if the given new input phrase was not in the training set, or not with a sufficient frequency, and therefore does not appear in the model; however this may be performed even for phrases that already appear in the model as-is. This may be performed because a phrase such as 'i want to cancel subscription to cable tv service' might have appeared a sufficient number of times to make it into the model, but its individual tokens (e.g. 'cancel', 'subscription', 'cable', 'tv' etc.) and also its sub-terms (e.g. 'i cancel' 'want to cancel', 'cancel subscription' etc.) will typically have appeared with a greater frequency, and so will have 'better' embeddings. By combining the embedding of the phrase itself, if it indeed exists in the model, with the embeddings of its component tokens and sub-terms, the resulting phrase embedding is typically be more robust and precise. In some embodiments, only tokens and terms which appear with a frequency above a certain threshold will appear in the model.

In one embodiment, the raw text version (e.g. not represented as a structured phrase) of a new input may be processed using the same or similar normalized phrase-extraction process as described with respect to the training stage herein, and of each of the resulting structured phrases may be processed through a similar sub-term extraction process as described with respect to the training stage herein. Input such as text snippets, phrases, tokens, and sub-terms may be applied to the look-up table. A multi-word input that is not itself in the look up table (such that when it is applied to the look-up table no entry is returned), its constituent parts, or tokens may be applied to the table to create embeddings for each token or sub-phrase, and a weighted average, e.g. using SIF scores, may be used to create the embedding for the multi-word input. In other embodiments, even if a multi-word input is in the table, its embedding may be combined with that of its constituent tokens or sub-phrases to create the embedding, using weights such as SIF scores. For sub-terms not in the model, a process may take their embedding to be the weighted average of their sub-ngrams which are in the model. An embodiment may combine these token and sub-term embeddings using a weighted average to give the final 'phrase embedding'. In one embodiment the terms are weighted by their respective SIF ('Smooth Inverse Frequency') scores. A vector representation of a structured phrase may capture the semantic meaning of the phrase, 'embedded' in a vector space such that phrases of similar semantic meaning will be positioned close to each other, for example as measured by cosine distance.

At inference or production, the combination of techniques described herein may improve prior technologies. Prior technologies weighting terms may be improved by using a normalized structure for phrases. Since two snippets of text, even if one is phrased in a more common way than the other, may result in the same structured phrase, taking the frequency of this common normalized phrase as the relevant statistic may result in more accurate and less volatile results. Further, embodiments may employ a topic relevancy score to weight the importance of terms when combining them. After a model is trained, embodiments may cluster the resulting embeddings and, in an iterative process, create a taxonomy of domain relevant 'topics' or 'categories' which may be clusters of similar terms (where 'similarity' may be measured by for example the cosine distances of their embeddings). For example topics may include 'billing disputes', 'internet connectivity', 'subscription upgrades' etc. which, if the training corpus was representative enough, may cover the main topics of interest for the domain or set of training texts. A newly seen input text, e.g. a phrase or sentence input by a user, may be compared to such topics.

The embedding of each category may then be calculated as the combination of its constituent term embeddings. Based on these category embeddings an embodiment may weight the importance of any term/sub-term by its topic relevance, e.g. how 'similar' is its embedding (taken from the model) to it closest category. If a certain sub-term is not close to any category then it may receive a low weighting in calculating the final phrase embedding. E.g. when calculating the embedding of 'i want to pay my bill before my vacation', whose sub-terms may include 'pay bill' and 'vacation', using a prior art 'frequency based' approach such as IDF then 'vacation' may get a higher weighting than 'pay bill' even though it is only incidental as far as the call is concerned. Thus embodiments may use both the frequency-based method and the domain oriented 'relevancy' method when weighting terms to give a more accurate and balanced resulting phrase embedding.

A SIF score may discount the significance or weight based on the frequency with which it occurs in a corpus, the assumption being that rarer words have more 'information content'. An example formula for producing a SIF score for a token having frequency of token_freq is:

$$SIF=a/(a+\text{token\_freq}) \text{ for some value of } a, \text{ typically } 0.001;$$

Term SIF scores of multi-word terms may be created by, instead of using the frequency with which the term itself occurs in the training corpus, combining SIF scores of individual tokens. The exact example term 'i want to talk to somebody about that' might appear less frequently in the training corpus than the word 'upgrade', but the information content in the latter may be higher, appearing as it does less frequently than any of the individual words contained in the former. On the other hand, embodiments may not only consider the token with highest SIF because it may be desirable to give multi-word terms such as 'cancel subscription' a higher weighting than each of its constituent tokens 'cancel' and 'subscription', since the combined term conveys more informational. As a 'middle-ground' between these two considerations, an embodiment may sort the tokens in order of SIF score and use a 'decaying' technique (reducing the weights or values of the elements in a sequence as the sequence progresses) so that each word does count, but to lesser degree the further along it is in the ordering. In one embodiment decaying is achieved by dividing each component by the integer indicating its order in the sequence; other decay methods may be used.

For example, for the example term "unplug cable from computer", the SIF scores for the component terms may be unplug (0.58); cable (0.23); from (0.03); and computer (0.45). These may be sorted having the highest (unplug) first to produce the ordering:

unplug (0.58); computer (0.45); cable (0.23); from (0.03).

The term SIF score may be created using the addition of a decaying set of the component SIF scores after ordering highest to lowest:

Term SIF score=(highest component SIF)/1+(2d highest component SIF)/2+ . . . +(nth highest component SIF)/n.

Using the specific examples above, the SIF score of the term "unplug cable from computer" may be calculated as: (0.58/1)+(0.45/2)+(0.23/3)+(0.03/4).

All terms contributing to the term SIF score may ensure that a multi-term phrase has a higher SIF score than merely that of the most significant component token. Decaying may ensure that a few tokens of low or medium significance will not have a higher SIF score than a single word of high significance. By combining the embeddings of all the tokens and sub-terms of a given phrase, weighted according their respective SIF scores, a final phrase embedding may be a robust and accurate semantic representation of the given phrase. An example embedding using weights such as SIF scores is, for the phrase "T1 T2 T3", where EX is an embedding associated with a token or word TX, and WX is the weight associated with that token or word TX:

$$\text{Example embedding for phrase "T1 T2 T3"} = E1*W1+E2*W2+E3*W3$$

FIG. 4 is a flowchart of a method according to embodiments of the present invention. While in one embodiment the operations of FIG. 4 are carried out using systems and data flows as shown in FIGS. 1-3, in other embodiments other systems and equipment can be used.

In operation 400, input may be received and processed to produce a corpus of texts or lexicon. In the call center context, this may include calls or interactions taking place, being converted to text, and stored. In other contexts a corpus may be gathered in other ways.

In operations 410-416, training samples may be generated at various resolutions or levels. In one embodiment, in operation 410, pre-processing may take place. For example, before training samples are created, different (e.g. alternating) speaker turns may be identified and the text divided or grouped into speaker turns; and structured phrases may be created. Each structured phrase may include a set of typically pre-defined slots, each slot associated with a part-of-speech, where each slot has added to it or included in it the word(s), token(s) or phrase from the input text.

In operation 412, phrase level or resolution input samples may be created, for example as described herein, for example based on structured phrases created in operation 410, and derivations or modifications of structured phrases.

In operation 414, turn level or resolution input samples may be created, for example as described herein, for example based on structured phrases created in operation 410, and derivations or modifications of structured phrases. For example, turn input sample may include text taken only from a single turn within a source text and may be formed by removing structure from structured phrases. In one embodiment, turn level resolution may differ from phrase resolution and each sample may include input from a single turn within the text.

In operation 416, call level or resolution input samples may be created, for example as described herein, for example based on structured phrases created in operation 410, and derivations or modifications of structured phrases. For example, call input samples from an input text may be created such that each call input sample includes input from more than one turn within the text, e.g. text across multiple turns may be the source for a call input sample. Call level resolution may differ from phrase and turn resolution.

In other embodiments of use cases, different resolutions other than phrase, turn and call may be used.

In operation 420, once all the training samples have been generated, at all the various resolutions, they may be input during a training phase to train a model. In other embodiments, training may commence before all samples are generated. In some embodiments, training samples at the turn and call level resolution may be input to an embedding model using a sliding window. Before training pre-processing may occur, e.g. duplicate training samples may be removed.

In operation 430, a look-up table may be created from a trained model. In one embodiment all single tokens and multi-word terms used during training may be entries in, and keys in, the look-up table.

In operation 440, as part of an inference to find a word embedding, an input text (e.g. a newly seen call or conversation) may be processed. For example, an input text may be processed to produce structured phrases, or in other embodiments one or more sub-terms, each sub-term including one or more words. Other processing may be performed, and in some use cases no pre-processing of an input text need be used.

In operation 450, the results of operation 440, e.g. structured phrases, or each sub-term, may be applied to an embedding model (e.g. input to a look-up table) to produce for the input an associated embedding. In some embodiments, for a phrase occurring within the input text, the embedding is based on a weighted combination of the sub-terms within the phrase, each weight being based on an inverse document frequency measure for the sub-term associated with the weight.

In operation 460, the embedding may be used to produce output, for example to produce a topic or subject for the input text e.g., based on, and displayed to a user. Embodiments may find use in intelligent text analytics technologies such as key-phrase extraction, topic modeling, semantic search, text or call summarization (e.g. to extract user or agent notes), and automated FAQs or chat-bots. Embodiments may find use in semantic search of text or calls by phrase, where input phrases are expanded semantically (e.g. searching for 'cancel account' to return calls or call-snippets containing 'terminate service', 'suspend subscription' etc.), which could also be used in real-time to assist agents searching for similar problems. Embodiments may be used in auto-categorization and auto-discovery technologies, which extract keyphrases from for example a customer's automatic speech recognition (ASR) transcripts and clusters them into topical or semantic groups using embeddings: thus a new document may, via its being converted to phrases and then the use of clustering, have topics generated for it. A new input sentence or phrase may have an embedding created, compared to document topics, and thus used for searching documents.

The operations of FIG. 4 are examples only, and different operations may occur in different embodiments.

Embodiments may improve on prior embedding technology. A prior art solution to embedding multi-word phrases is to simply combine the embeddings of the individual words, e.g. by concatenation, summing, averaging, or weighted averaging of the word embedding vectors. Prior approaches that train phrases directly into the model include treating 'collocations' (the habitual juxtaposition of a particular word with another word or words with a frequency greater than chance), words which commonly appear in juxtaposition e.g. 'New York', 'credit card' etc. (e.g. extracted using techniques such as pointwise mutual information ("PMI") as single tokens ('New_York', 'credit_card' etc.), or by extracting n-grams so that, for example, the sentence 'i want to cancel my account' would generate the following n-grams, (for n=2,3): 'i _want', 'want _to', 'to _cancel', 'cancel _my', 'my _account', 'i _want _to', 'want _to _cancel', 'to _cancel _my', 'cancel _my _account' (although this is more as a step towards the embedding a complete sentence, rather than for the phrases per-se. Prior n-gram based techniques have the disadvantages of using a high number of not-well-formed phrases, without structure, and using arbitrary filtering.

While prior art methods of simple summing or averaging word embeddings to produce phrase embeddings can produce reasonable results, embodiments of the present invention improve on such technology by, in part, training phrases directly into a model to produce more accurate and robust embeddings; this may be especially true in cases where the semantic meaning of a phrase is not simply the sum of its parts. The prior art collocations approach is limited, being able to identify only very short (typically 2 or 3 word) terms, but not capturing phrases such as 'you need to connect ethernet cable to router'; also, tokens in such prior art systems should be contiguous, and word order matters (e.g. 'cancelled_account' vs. 'account_cancelled'). Furthermore, by such prior art systems joining the collocation into a single unit (e.g. interest_rate), the individual words ('interest' and 'rate') may be sacrificed. The prior art n-grams approach also has problems such as the explosion of the number of terms and their unstructured and non-well-formed nature (e.g. 'cancel_my' in the above example). Moreover, like collocations, such prior art approaches typically capture only contiguous tokens; thus in a sentence such as 'i paid the previous month's cable tv bill' the words 'paid' and 'bill' would likely not end up in the same n-gram despite their obvious relatedness.

Embodiments of the present invention may improve such prior solutions by, in some implementations, grammatically structuring the phrases, to enable training well-formed phrases directly into the embedding model, while, at the same time, achieving huge vocabulary compression from the normalization of the equivalent variants. This in turn may allow the resulting terms to get more intensive training (instead of their occurrences being diluted across these variants) resulting in better quality embeddings. Furthermore, by creating training samples at different levels of resolution, embodiments may get the best of both worlds: increased precision from the highly focused phrase-level resolution, where the phrase itself constitutes a natural and cohesive context window, while inter-phrase relations are discovered at the speaker turn and call resolutions. Embodiments may allow for accuracy and robustness to be further enhanced by the novel technique of sub-term generation, employed for example both when creating the training samples (which effectively multiply the size of the original dataset by adding terms which are not explicitly in the corpus in precisely that form), and also during post-training inference. Novelties in some embodiments may lie both in the individual techniques discussed herein and also in the way that they interact and combine, mutually reinforcing and complementing each other.

Embedding module 52 may be, or may be implemented using, a NN, an information processing paradigm that may include nodes, referred to as neurons, organized into layers, with links between the neurons. The links may transfer signals between neurons and may be associated with weights. Typically, the neurons and links within a NN are "virtual" and are represented by mathematical constructs, such as activation functions and matrices of data elements and weights. A processor, e.g. CPUs or graphics processing units (GPUs), or a dedicated hardware device may perform the relevant calculations. In some embodiments, vectors are calculated two ways: directly from text in a source (e.g. creating phrase vectors based on the text in the phrase) or from other vectors (e.g. creating query vectors based on phrase vectors), and the direct calculation may in some embodiments be via a neural network.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for training a phrase embedding model, the method comprising:
   creating a sequence of one or more structured phrases from an input text of a conversation; and
   creating a training set of phrase-level training samples, turn-level input samples and call-level input samples from the input text, each phrase-level training sample consisting of input from a single turn within the text, from one of multiple speakers in the conversation, beginning and ending when one of the multiple speakers changes, at least some turn-level input samples consisting of a string of text being formed by removing structure from structured phrases, said phrase-level training samples having high resolution and less context, said turn-level input samples having medium resolution and medium context, relative to the phrase-level training samples, and said call-level input samples having lower resolution and maximum context, relative to the phrase-level training samples and the turn-level input samples;
   creating one or more call-level input samples from the input text, each call-level input sample comprising input from structured phrases from more than one turn within the text; and
   training an embedding model using the structured phrases, turn-level input samples, and call-level input samples.

2. The method of claim 1 wherein each structured phrase comprises a set of fixed slots, each slot associated with a part-of-speech.

3. The method of claim 1 wherein the embedding model is used to generate a look up table comprising semantic embeddings.

4. The method of claim 1 comprising generating input samples to be used to train the embedding model by generating combinations of tokens, each combination corresponding to a sub-combination of slots in a structured phrase.

5. A system for training a text embedding model, the system comprising:
   a memory; and
   a processor configured to:
      create one or more structured phrases from an input text of a conversation;
      create one or more turn-level input samples from the input text, each turn-level input sample consisting of input from a single turn within the text, from one of multiple speakers in the conversation, beginning and ending when one of the multiple speakers changes at least some turn-level input samples consisting of a string of text being formed by removing structure from structured phrases;
      creating one or more call-level input samples from the input text, each call-level input sample comprising input from structured phrases from more than one turn within the text; and
      train an embedding model using the structured phrases, turn-level input samples and call-level samples, said phrase-level training samples having high resolution and less context, said turn-level input samples having medium resolution and medium context, relative to the phrase-level training samples, and said call-level input samples having lower resolution and maximum context, relative to the phrase-level training samples and the turn-level input samples.

6. The system of claim 5 wherein each structured phrase comprises a set of slots, each slot associated with a part-of-speech.

7. The system of claim 5 wherein the embedding model is used to generate a look up table comprising semantic embeddings.

8. The system of claim 5 wherein the processor is configured to generate input samples to be used to train the embedding model by generating combinations of tokens, each combination corresponding to a sub-combination of slots in a structured phrase.

9. A method for performing inference to find a word embedding, the method comprising:
   processing an input text of a conversation to produce a plurality of structured phrases, and for each structured phrase:
   generating sub-terms, each sub-term comprising one or more words;
   looking up an embedding corresponding to each sub-term in an embedding model, said model trained according to the method of claim 1; and
   producing an embedding for a phrase occurring within the input text based on a weighted combination of the sub-terms within the phrase, each weight being based on an inverse document frequency measure for the sub-term associated with the weight.

10. The method of claim 9, wherein the sub-terms are generated from structured phrases, the structured phrases generated by processing the input text.

11. A method for training an embedding model, the method comprising:
   creating, from an input text of a conversation comprising different speaker turns, input samples at a phrase level of resolution;
   creating from the input text one or more turn-level input samples, each turn-level input sample consisting of input from a single turn within the text from one of multiple speakers in the conversation, beginning and ending when one of the multiple speakers changes and at least some of the turn-level input samples being formed using input samples at a turn-level of resolution, lower than the phrase-level of resolution and having greater context than the phrase-level;

creating one or more call-level input samples from the input text, each call-level input sample comprising input from structured phrases from more than one turn within the text said call-level samples having lower resolution and greater context than said turn-level samples; and training the embedding model using the input samples at the phrase-level of resolution, the turn-level input samples, and the call-level input samples.

12. The method of claim 11 wherein the first level of resolution is based on structured phrases.

13. The method of claim 12 wherein each structured phrase comprises a set of slots, each slot associated with a part-of-speech.

14. The method of claim 11 comprising training the embedding model using input samples created at a third level of resolution, the third level of resolution being input to the embedding model using a sliding window.

\* \* \* \* \*